United States Patent Office 3,527,671
Patented Sept. 8, 1970

3,527,671
PROCEDURE FOR THE SEPARATION OF ISOTOPE-CONTAINING AMINO ACID RACEMATES INTO THEIR OPTICAL D- AND L-ANTIPODES
Meinhart H. Zenk, Menzinger Str. 67, and Juergen Schmitt, Menzinger Str. 34, both of Munich, Germany
No Drawing. Filed Nov. 15, 1965, Ser. No. 507,645
Claims priority, application Germany, June 11, 1965, Z 11,589
Int. Cl. C12b 1/00
U.S. Cl. 195—2
8 Claims

ABSTRACT OF THE DISCLOSURE

An enzyme acetyl-CoA:D-amino acid-$\alpha$-N-acetyl-transferase is isolated from yeast by an extraction sequence. The enzyme is selective in reacting with the D-antipode of isotopically labelled amino acid racemates, and can be used in resolving such racemates into their respective D- and L-antipodes.

---

The invention concerns a procedure for the separation of isotopic labelled amino acid racemates into their optical D- and L-antipodes. The problem of the separation of racemic amino acids is not new. The problem is especially interesting for the producers of radiochemicals, since chemically synthetized isotopic labelled amino acids always occur as racemates. For scientific investigations however in most cases only the pure L- or D-amino acids are suitable, for instance for the elucidation of synthetic or catabolic pathways in cell metabolism.

Up to now only a few enzymatic procedures are known for the separation of optical isomers of amino acids (D-amino acid-oxidase, L-amino acid-oxiadse), chemical acylation of all molecules in the racemate and following hydrolysis of the acyl-L-amino acid with acylase or carboxypeptidase (see: J. P. Greensten in Methods in Enzymology, vol. III, Colowick and Kaplan editors, Academic Press, 1957). These procedures, however, are not suitable for producing isotopic labelled pure D- or L-isomers since they generally lead to a complete loss of one of the optical antipodes. Chemical procedures cannot successfully be applied to the separation of isotopic labelled amino acid racemates, these compounds regularly existing only in very small amounts and chemical procedures necessarily leading to an extreme loss of specific activities.

According to the invention the D-component of an isotopically labelled amino acid racemate is reacted selectively in the presence of an enzyme from yeast called: Acetyl-CoA:D-amino acid-$\alpha$-N-acetyltransferase by action of acetyl-Coenzyme A or propionyl-Coenzyme A or of any other suitable acyl-Coenzyme A derivative.

The new method is also applicable to extremely small samples of for instance isotopic labelled amino acids. The enzyme used, acetyl-CoA:D-amino acid-$\alpha$-N-acetyltransferase, catalyses the transfer of the acetyl group of acetyl-CoA, the propionyl-group of propionyl-CoA or any other active acyl-CoA on to the amino group of D-amino acids and is completely inactive against L-amino acids. In this way a chemical difference between the D- and L-isomers can be introduced into the racemates allowing a further separation according to known methods. Separating the N-acylamino acids from the not attached L-amino acids can be accomplished by ion exchange absorption, chromatograph, electrophoresis or extraction with organic solvents.

Since for practical purposes the L-form of aminoacids is of greater value than the D-form, the separated N-acyl-D-amino acid component can be converted again to a DL-amino acid racemate by chemical methods. This racemate again can be separated by the procedure described above into its optical isomers. By several repetitions of this process an almost quantitative transfer of the original racemate into the pure L-form is to be obtained. By an analogous procedure involving racemization of the L-form the pure D-form in almost quantitative yield.

In the following an example of the invented process is described.

First the purification of the enzyme: acetyl-CoA:D-amino acid-$\alpha$-N-acetyltransferase from yeast will be described and an example for the separation of an isotopically labelled amino acid racemate will be given.

(1) PURIFICATION OF THE ACETYLTRANSFERASE

The enzyme can be purified according to the procedure of Zenk and Schmitt (Biochemische Zeitschrift 342, 54–65, 1965), however for large quantities of the enzyme the following method has been applied successfully:

Extraction (a) About 1000 gram freshly airdried bakers yeast (*Saccharomyces cerevisiae*) are stirred for 3.5 hrs. at room temperature with 4 ltr. 0.1 m. tris-HCl buffer (tris=hydroxymethyl-aminomethane) pH=8.4. The suspension is centrifuged at 0–4° C., the supernatant decanted and the residue stirred again for an additional 30 min. in 1 ltr. of the above buffer and centrifuged again. The combined supernatants contain the enzyme. From now on all procedures are done at a temperature of 4° C.

(b) Treatment with protamine-sulfate.—To the protein solution a solution of 2% protamine sulfate (1 ml. for 800 mg. yeast protein) is slowly added with continuous stirring. The precipitate is allowed to settle over night in a glass cylinder. The supernatant solution containing the enzyme is then decanted.

(c) Adsorption onto CM-Sephadex-cation-exchanger-gel.—The clear solution containing the enzyme is now applied to a glass column with a diameter of 10 cm. and a height of 50 cm. which is charged to a height of 10 cm. with a well swollen gel of CM-Sephadex C–50 medium. The protein solution is allowed to pass slowly through the column. The gel is washed in the column with 0.1 M tris-buffer pH 8.4 until no protein appears anymore in the effluent. Then the enzyme is eluted with a 2% KCl solution in 0.1 M tris-HCl buffer pH 8.4.

(d) Ammonium sulfate fractionation (0–0.3).—The enzyme solution of the gel step is brought with stirring to an ammonium sulfate concentration of 30% with solid $(NH_4)_2SO_4$. After standing for 10 min. the precipitate is centrifuged off at $20,000 \times g$ and discarded.

(e) Second $(NH_4)_2SO_4$ fractionation (0.3–0.6).—The supernatant of step (d) is brought to 60% $(NH_4)_2SO_4$ saturation with the solid salt. After standing the precipitate containing the enzyme is collected by centrifugation. The supernatant is discarded, the precipitate dissolved in 40 ml. 0.1 M tris-buffer pH 8.4 and dialysed against 6 ltr. 0.01 M tris-buffer pH 8.4 for at least 4 hrs.

(f) Acetone precipitation (0–40%).—To the dialysed protein solution cooled in an ice/NaCl-freezing mixture is added with stirring cold (−15° C.) acetone till the solution contains 40% acetone. The temperature should be kept between 0 and +4° C. The precipitate is centrifuged off and discarded.

(g) Second acetone precipitation (40–75%).—The supernatant solution of the above step is brought to 75% with cold acetone. After 10 min. the precipitate is centrifuged off ($20,000 \times g$) and is taken up in 10 ml. 0.1 M tris-buffer pH 8.4. The solution is dialysed at least for 3 hrs. against 6 ltr. 0.01 M tris-buffer pH 8.4. The dialysate is clarified by centrifugation. The solid residue is discarded. The final enzyme preparation will contain its activity at 0–2° C. at least for 1 month. Frozen preparations will loose on thawing in icewater at least half of its activity.

(2) ASSAY OF THE ACETYLTRANSFERASE

| Fraction | Total volume, ml. | Total protein, mg. | Total units | Specific activity, units/mg. | Recovery, percent |
|---|---|---|---|---|---|
| Crude extract | 2,782 | 29,580 | 89,200 | 3.03 | 100 |
| Adsorption by CM-Sephadex | 41.5 | 135 | 65,510 | 492 | 73 |
| Second acetone fractionation | 10.2 | 27.5 | 39,780 | 1,440 | 41 |

1 milli-uni (m$\mu$) is defined as that amount of acetyltransferase which catalyses the formation of 1 m$\mu$ mol acetyltryptophane/min. at 30° C. and pH 8.4.

The enzyme can be assayed according to 3 different methods.

Enzymtest A

Incubation mixture: 150 $\mu$M tris-HCl, pH 8.4, 20 $\mu$mol D-tryptophan, 10 $\mu$M acetylphosphate (Boehringer), 0.25 $\mu$mol CoA (Boehringer), 0.003 mg. phosphotransacetylase (Boehringer), enzyme( 4–6 m$\mu$), total volume of 1.0 ml. Incubation time: 60 min. at 30° C. For crude yeast extracts, 40 $\mu$M potassium fluoride is included to inhibit phosphatases.

The reaction is terminated by the addition of 0.3 ml. 2 N $H_2SO_4$, 0.2 ml. water added to bring the volume to 1.5 ml. and the denaturated protein is centrifuged off. The supernatant is transferred to a conical stoppered glasstube which is cooled in an ice bath. The centrifuge tube is rinsed with a cold mixture of ether; ethylacetate (3:7) and the rinsings added to the supernatant. Formed acetyltryptophan is extracted by shaking, 1 ml. of the etherphase is added to 1 ml. 0.05 N NaOH, the ether removed in a current of air and the aqueous phase is assayed for indoles with p-Dimethylaminobenzaldehyde. 0.1 $\mu$M acetyltryptophane gives an extinction of $\Delta E = 0.315$. The determined amount of acetyltryptophane is corrected against known amounts of acetyltryptophane extracted in the same way.

Enzymtest B

This assay can only be used with very pure enzymes. As amino acids only aliphatic ones can be used since they do not absorb in UV-light. The reaction is followed at 232 m$\mu$ in a temperature constant photometer.

Reaction mixture (2 ml.): 300 $\mu$M tris-HCl, pH 8.4, 40 $\mu$M-D-amino-acid, 0.3 $\mu$M acetyl-CoA or propionyl-CoA and pure enzyme (20–30 m$\mu$). The reaction is followed at 39° C. The enzymatic acetylation can be seen on the basis of a drop at 232 m$\mu$ of the acetyl-CoA band.

(3) THE D-ISOMERS OF FOLLOWING AMINO ACIDS HAVE BEEN SHOWN TO BE SUITABLE SUBSTRATES FOR THE ACETYL-CoA: D-AMINO ACID-α-N-ACETYLTRANSFERASE

Alanine; α-amino-n-butyric acid; α-amino-γ-phenyl-butyric acid; asparagine; aspartic acid; ethionine; 2-(3-carboxy-4-hydroxy-phenyl)glycine; m - carboxy - phenylalanine; allocystathionine; cysteine; cystine; citrulline; 3,5-diiodothyronine; djenkolic acid; o-, m- and p-fluorophenylalanine; glutamine; glutamic acid; histidine; homoserine; isoleucine; allo-isoleucine; isovaline; kynurenine; leucine; lysine; methionine; methionine-sulfoxide; α-methylserine; norleucine; norvaline; ornithine; β-phenyl-α-alanine, β-phenyl-β-alanine; α-phenylglycine; phenylserine; proline; serine; threonine; thyronine; tryptophane; tyrosine; valine.

(4) SEPARATION OF DL-ALANINE-1-$^{14}$C INTO PURE D- AND L-ANTIPODES

Incubation mixture: 10 $\mu$M DL-alanine-1-$^{14}$C (0.1 mc.); 300 $\mu$M tris-HCl pH 8.0 40 $\mu$M acetylphosphate, 1.5 mg. CoA; 0.005 mg. phosphotransacetylase; 1000 m$\mu$ acetyl-CoA: D-amino-acid-α-N-acetyltransferase, and $H_2O$ and 1.5 ml. Temperature 37° C. The mixture is variable according to quantity of racemate. After quantitative acetylation of D-alanine (10 hrs.), the separation of L-alanine can be performed. For instance with an ion-exchange resin: a glass column (7 mm. diameter) is filled to 3.5 ml. in height with HCl treated exchanger (Dowex 50 WX8) and the incubation mixture is added. The acetyl-alanine is eluted with water (about 30 ml.) and 80% ethanol (50 ml.). In addition the column is washed with water and L-alanine is eluted with 2 N $NH_4OH$ (ca. 60 ml.) or 2 N HCl (ca. 50 ml.).

Acetyl-alanine is concentrated and either hydrolysed with 2 ml. 2 N HCl for 3 hrs. to yield pure D-alanine or again racemised with an acetic acid/acetic anhydride mixture.

The acetylamino acid is refluxed with for 10 min. with 2 ml. glacial acetic acid and 0.2 ml. acetic acid anhydride and then allowed to stand for 2 hrs. at room temperature. The produced N-acetyl-DL-alanine can again be separated into D- and L-antipodes with the above mentioned method after hydrolysis of the acetyl group.

What is claimed is:

1. Process of N-acetylating an alpha-D-amino acid, which comprises: contacting the acid with acetyl-CoA:D-amino acid-alpha-N-acetyltransferase, wherein the acid is selected from the group consisting of alanine; alpha-amino-n-butyric acid; alpha-amino-alpha-phenyl-butyric acid; asparagine; aspartic acid, ethionine; 2-(3-carboxy-4-hydroxy-phenyl) glycine; m-carboxy-phenyl-alanine; allocystathionine; cysteine; cystine; citrulline; 3,5-diidothyronine; djenkolic acid; o-, m- and p-fluorophenyl-alanine; glutamine; glutamic acid; histidine; homoserine; isoleucine; allo-isoleucine; isovaline; kynurenine; leucine; lysine; methionine; methionine-sulfoxide; alpha-methyl-serine; norleucine; norvaline; ornithine; beta-phenyl-alpha-alanine; beta-phenyl-beta-alanine; alpha-phenyl-glycine; phenylserine; proline; serine; threonine; thyronine; tryptophan; tyrosine and valine, said enzyme acetyl-CoA:D-amino acid-alpha-N-acetyltransferase being obtained by:

(a) extracting a dried yeast with a buffer solution whereby a protein solution is obtained;

(b) contacting the protein solution with protamine sulfate whereby a precipitate and a first supernatant solution containing the enzyme are formed;

(c) separating said first supernatant solution and contacting it with a cationic ion exchanger;

(d) eluting said enzyme from said gel;

(e) contacting the eluate from (d) with ammonium sulfate, and collecting the resulting precipitate therefrom;

(f) dialyzing said precipitate of (e); and (g) extracting said enzyme from the dialyzate of (f) with acetone.

2. The process of claim 1 wherein the buffer solution of (a) comprises a hydroxymethylaminomethane-hydrochloric acid solution having a pH of about 8.4.

3. The process of claim 1 wherein the protamine sulfate solution of (b) contains about 2 percent of said sulfate.

4. The process of claim 1 wherein said enzyme is obtained by:

(a) extracting a dried yeast with a buffer solution whereby a protein solution is obtained;

(b) contacting the protein solution with protamine sulfate whereby a precipitate and a first supernatant solution containing the enzyme are formed;

(c) separating said first supernatant solution and contacting it with a CM-Spehadex-cation-exchanger gel, whereby said enzyme is adsorbed by said gel;
(d) eluting said enzyme from said gel;
(e) contacting the eluate from (d) with sufficient ammonium sulfate to provide an ammonium sulfate concentration of about 30 percent, whereby a precipitate and a second supernatant solution are formed;
(f) separating said second supernatant solution from the precipitate formed in (e);
(g) contacting said second supernatant solution with sufficient ammonium sulfate to provide an ammonium sulfate concentration of about 60 percent, and collecting the resulting precipitate therefrom;
(h) dialyzing said precipitate of (g); and
(i) extracting said enzyme from the dialyzate of (h) with acetone.

5. Process for resolving a mixture of an alpha-DL-amino acid, which comprises: contacting said mixture with acetyl-CoA:D-amino acid-alpha-N-acetyl-transferase at about 40° C., whereupon the D antipode is acylated selectively, and separating the acylated D antipode and the L antipode, wherein the acid is selected from the group consisting of alanine; alpha-amino-n-butyric acid; alpha-amino-alpha-phenylbutyric acid; asparagine; aspartic acid; ethionine; 2-(3-carboxy-4-hydroxy-phenyl) glycine; m-carboxyphenylalanine; allocystathionine; cysteine; cystine; citrulline; 3,5-diiocothyronine; djenkolic acid; o-, m- and p-fluorophenylalanine; glutamine; glutamic acid; histidine; homoserine; isoleucine; allo-isoleucine; isovaline; kynurenine; leucine; lysine; methionine; methioninesulfoxide; alpha-methylserine; norleucine; norvaline; ornithine; beta-phenyl-alpha-alanine; beta-phenyl-beta-alanine; alpha-phenylglycine; phenylserine; proline; serine; threonine; thyronine; tryptophan; tyrosine and valine, said enzyme acetyl-CoA:D-amino acid-alpha-N-acetyltransferase being obtained as defined in claim 1 by (a) through (g).

6. Process of claim 5, wherein the mixture comprises isotopically labelled DL-amino acid racemates.

7. Process of claim 5 wherein the racemate comprises DL-alanine-1-$^{14}$C.

8. Process of claim 5, wherein said enzyme acetyl-CoA:D-amino acid-alpha-N-acetyltransferase is obtained as defined in claim 4 by (a) through (i).

References Cited

UNITED STATES PATENTS

| | | | |
|---|---|---|---|
| 3,086,916 | 4/1963 | Kinoshita et al. | 195—29 |
| 3,290,225 | 12/1966 | Rauenbusch et al. | 195—29 |
| 3,386,888 | 6/1968 | Chibata et al. | 195—2 |

OTHER REFERENCES

Greenstein et al., Chemistry of the Amino acids, vol. I, pp. 728–42, New York, Wiley, 1961, QP801.A5G7.

HENRY R. JILES, Primary Examiner

NATALIE TROUSOF, Assistant Examiner

U.S. Cl. X.R.

195—29, 62, 66; 260—309, 326.14, 326.3, 518, 519, 534, 691